United States Patent [19]

Niolon, Jr.

[11] Patent Number: 5,760,316

[45] Date of Patent: Jun. 2, 1998

[54] ELECTRICAL PENETRATOR APPARATUS FOR BULKHEADS

[76] Inventor: Spencer L. Niolon, Jr., 109 Barracuda, Lafayette, La. 70508

[21] Appl. No.: 724,763

[22] Filed: Oct. 3, 1996

[51] Int. Cl.$^6$ .................................................. F16L 55/10
[52] U.S. Cl. ............................................................ 73/866.5
[58] Field of Search .......................... 73/86, 756, 866.5; 374/208

[56] References Cited

U.S. PATENT DOCUMENTS

| | | | |
|---|---|---|---|
| 3,558,462 | 1/1971 | Wilson | 204/195 |
| 3,627,493 | 12/1971 | Manley | 73/86 |
| 3,639,876 | 2/1972 | Wilson | 338/13 |
| 3,714,012 | 1/1973 | Herron | 204/195 |
| 3,772,178 | 11/1973 | Wilson | 204/195 |
| 3,951,506 | 4/1976 | Bennett et al. | 439/604 |
| 4,795,359 | 1/1989 | Alcock et al. | 439/271 |
| 5,234,570 | 8/1993 | Taylor et al. | 204/435 |
| 5,323,429 | 6/1994 | Roarty et al. | 376/249 |
| 5,450,765 | 9/1995 | Stover | 73/866.5 |

OTHER PUBLICATIONS

"Remote Monitoring of Cathodic Protection Potentials" *Offshore Services* Sep. 1979 pp. 109, 111 & 112.
Product Data Sheet, Kemlon Products & Development Co. Houston, Texas, date unknown.

*Primary Examiner*—Robert Raevis
*Attorney, Agent, or Firm*—Domingue, Delaune & Waddell

[57] ABSTRACT

A device for transmitting an electrical current through a bulkhead, with the bulk-head having an opening therein. The bulkhead has a first side that is under a pressure. The device includes a housing, fitted within the opening, a pin contact operatively positioned within the housing, and a solder cup operatively associated with the pin contact. A generating member, operatively adapted to the solder cup, for generating an electrical current representing a measured physical parameter within the bulk head is included. The device further comprises a sleeve member adapted for coupling the generating member, the pin contact and the solder cup so that the electrical current is transmitted from the generating member to the pin contact. A sealing mechanism is included so that the pressures within the bulkhead are prevented from migrating through the device.

12 Claims, 3 Drawing Sheets

5,760,316

1

ELECTRICAL PENETRATOR APPARATUS FOR BULKHEADS

BACKGROUND OF THE INVENTION

This invention relates to a device that transmits an electrical current through a bulk head. More particularly, but not by way of limitation, the device may be installed on a pressure container and will allow the transmission of an electrical current through the container.

In the production and processing of oil and gas, the hydrocarbons will be transported from the well to a production facility. As the search for new reserves continues, the exploration has focused on remote and exotic locations. Thus, the production facilities are many times located in harsh offshore waters and/or in sparsely populated areas. From the production facility, the hydrocarbons must be transported to a down stream process facility. At this plant, the hydrocarbons may be refined into various products for eventual usage by consumers.

The transportation from the reservoir to refinery entails the storage, separation, and containment of the reservoir fluids and gas. The various wells, vessels, pipelines, flow lines and other containers used during the production and refining process will be under pressure. Also, the various vessels, pipelines, flow lines and other containers will be of an elevated temperature.

Due to the elevated pressures and temperatures, the various containers may tend to corrode. Also, as those of ordinary skill in the art will appreciate, pressure and temperature drops associated with the transportation will cause precipitation of various compounds, hydrate formation, etc. Other problems associated with the transportation pose environmental and safety hazards. These types of problems may also cause loss of production. Thus, the conditions require monitoring by operators.

As noted earlier, the various production and transportation facilities are many times located in remote areas. Nevertheless, the various physical parameters of the wells, vessels, pipelines, flow lines and other containers used during the production and refining process will have to be monitored and/or checked in some fashion. Utilizing prior art systems, this could entail shutting-in of production facilities, opening of the particular container and manually inspecting the container. This is a time consuming and expensive procedure. Also, the equipment thus inspected may have already deteriorated such that permanent damage may have accrued.

Thus, there is a need for an apparatus that will monitor wells, vessels, pipelines, flow lines and other containers. There is also a need for a device that will allow the monitoring to be conducted via an electrical current so that parameters such as pressure, temperature may be monitored in real time. There is also a need for an apparatus that will allow the transmission of an electrical current generated within a pressure vessel to be ultimately transmitted to a second location, such as a control monitoring platform, or shore base.

SUMMARY OF THE INVENTION

An apparatus for transmitting an electrical current is disclosed. The apparatus with be associated with a container having an inner portion and an outer portion, and wherein the inner portion is under a pressure. The apparatus comprises a housing that is received within a container opening. The apparatus further comprises an electrical conductor having a first end and a second end, with the electrical conductor being disposed within the inner diameter of the housing.

A sealing means for sealing the electrical conduit within the housing is included so that the pressure is prevented from migrating through the inner diameter of the housing. The apparatus will also consist of generating means, positioned within the inner portion of the container, for generating the electrical current, as well as an attaching means for attaching the generating means and the electrical conduit so that the electrical current is transmitted to the electrical conductor.

In the preferred embodiment, the housing comprises a receptacle housing having an outer surface and an inner surface. The receptacle housing has an external thread means for threadedly engaging the opening of the container and an insert housing adapted within the inner surface of the receptacle housing. The insert housing may have a seal means for sealingly engaging the inner surface of the receptacle housing. It should be noted that the electrical conductor is disposed within the inner surface.

The attaching means will generally comprises a solder cup consisting of a first end and a second end, and wherein the first end is threadedly attached to the electrical conductor. The electrical conductor consist of a nickel-iron alloy 52 that is commercially available from Criterion Metals Inc. of Rhode Island under the name Alloy-52. Further, the sealant means comprises of glass material preform that is commercially available from SeaCon/Phoenix Inc. of Rhode Island under the name compression glass.

The apparatus may further comprising a sealing tape means for encapsulating the attaching means and said first end of said electrical conductor along with a shrink sleeve member, disposed about the sealing tape means and adapted for coupling the attaching means and the first end of the electrical conductor.

In one embodiment, the container is a separator means for separating a reservoir fluid and gas and wherein the generating means is a reference electrode means for measuring a voltage potential between an electrode and the pressure separator. In another embodiment, the generating means is a pressure sensor means for measuring the pressure within the separator and generating a signal indicative of the pressure. In yet another embodiment, the generating means is a temperature sensor means for measuring the temperature within the separator and generating a signal indicative of the temperature. Also, the device is used for impressed current for cathodic protection in vessels.

An advantage of the present invention is that an electrical current can be transmitted through a bulk head having a differential pressure between the inner portion and the outer portion. Another advantage is the apparatus allows the operator to install the apparatus through a bulk head without twisting the connected wire. Yet another advantage is the ability of the operator to monitor the various parameters in real time.

Another advantage is that the electrical conductor leading from the apparatus may then be operatively associated with a computer converter which ultimately may be transmitted via modem to a different location such as a control platform or shore base. Still another advantage includes the ability to connect to different types of internal sensors. Another advantage includes its use with pressure vessels, flow lines, pipelines, etc.

A feature of the present invention includes having a housing including an insert member and a receptacle member, wherein the insert and receptacle cooperate to sealingly fit within the container opening. Another feature includes use of a solder cup to attach the generating means with the electrical conductor.

Yet another feature includes sealingly engaging the apparatus with the opening of the container. Yet another feature is use of the glass preform/sealant to seal the internal end of electrical conductor within the insert housing. Another feature is use of sealing tape means for encapsulating the solder cup with the electrical conductor.

BRIEF DESCRIPTION OF THE PREFERRED EMBODIMENTS

DESCRIPTION OF THE PREFERRED EMBODIMENTS

Figure 1:
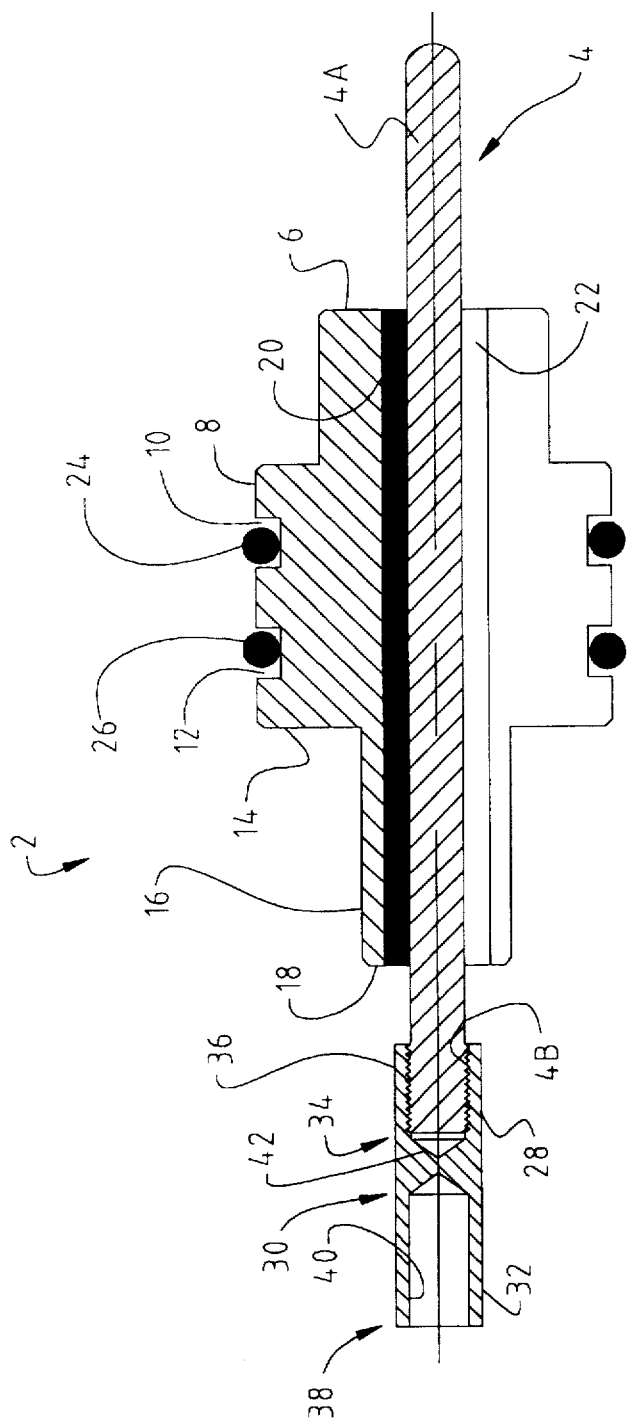
FIG. 1 is a cross-sectional view of the insert housing and electrical conductor of the present invention.

Referring now to FIG. 1, a cross-sectional view of the insert housing 2 and electrical conductor 4 of the present invention is shown. The insert housing contains a radially flat surface 6 that extends to the first cylindrical surface 8, with the first cylindrical surface having a first groove 10 and a second groove 12. The first cylindrical surface 8 terminates at the radially flat surface 14 that in turn extends to the second cylindrical surface 16. The second cylindrical surface 16 terminates at the radial shoulder 18 that in turn extends to the inner diameter bore surface 20, and wherein the inner bore 20 and conductor form an annulus 22.

As depicted in FIG. 1, the grooves 10 and 12 will have o-ring members 24 and 26 disposed therein. The insert housing also has associated therewith the electrical conductor 4 being disposed within the inner bore 20. In one embodiment, the electrical conductor 4 is formed of a metal alloy comprising alloy 52 that is commercially available from Criterion Metals Inc. The electrical conductor 4 will have a first end 4A and a second end 4B, with the end 4B having contained thereon external thread means 28 for engaging a cooperating thread member.

As pointed out earlier, the electrical conductor 4 is disposed within the inner bore 20. In the preferred embodiment, the annulus 22 will be filled with a sealant, such as a glass sealant for sealing the electrical conductor 4 within the annulus 22. The sealant used may be a glass material preform commercially available from SeaCon Phoenix under the name compression glass. Thus, a fluid and/or gas pressure will not be able to be transmitted through the annulus 22 from end 4B relative to end 4A.

An attaching means, seen generally at 30, for attaching the generating means (not shown in FIG. 1) and the electrical conductor 4 is also provided. Generally, the attaching means 30 is constructed of a solder material which in the preferred embodiment is a low-melting alloy usually of the lead-tin type, commercially available. The solder cup 30 comprises generally a cylindrical member 32 that has a first end 34 having an internal portion 36 adapted to receive the end 4B of the electrical conductor 4. The solder cup internal portion 36 will have thread means to threadedly engage the electrical conductor end 4B. The cylindrical member 32 contains a second end 38 having an internal portion 40. The generating means may be adapted to be received within the internal portion 40. In the preferred embodiment, the ends 34 and 38 are separated by the wall 42.

It should be noted that in the preferred embodiment, the silver plate pin contact wall of the solder cup is 0.00025 inches as a minimum. The pressure rating of the device will be approximately 3,000 psi. Further, the voltage rating is 500 volts alternating current. The insulation resistance is 500 mega-ohms.

Figure 2:
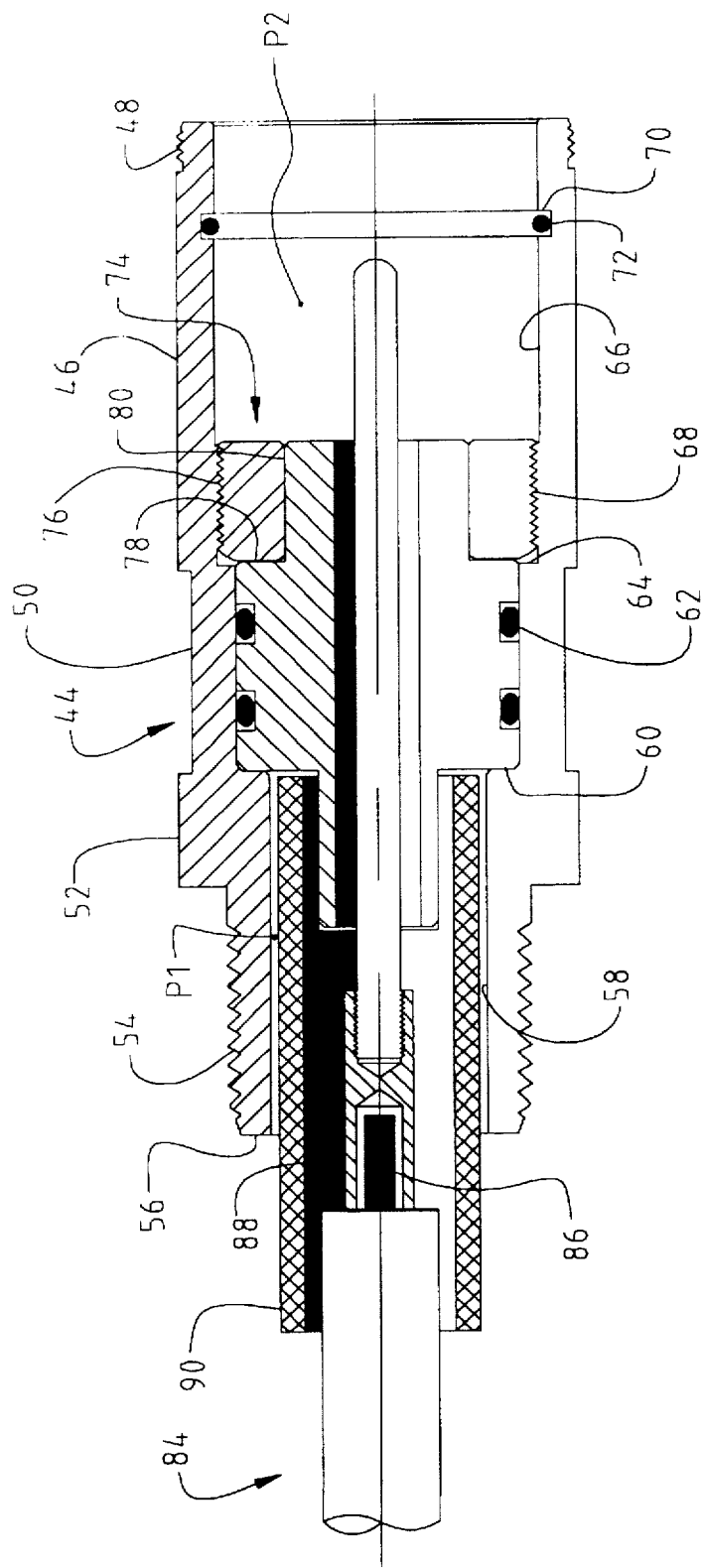
FIG. 2 is a cross-sectional view of the preferred embodiment of the assembled apparatus.

Referring now to FIG. 2, a cross-sectional view of the preferred embodiment of the assembled apparatus is illustrated. The insert housing 2 is disposed within the receptacle housing 44. Generally, the receptacle housing 44 consist of a cylindrical member having a first outer cylindrical surface 46 that contains thereon the external thread means 48 which in turn extends to a second cylindrical surface 50. The surface 50 concludes at the shoulder 52, with the shoulder 52 extending to the external thread means 54. The external thread means 54 will be adapted to be received within an opening contained on the container. The external thread means 54 will sealingly engage the opening, with the opening having cooperating sealing threads. Thus, the surfaces 52, 50, and 46 will generally be positioned relative to the container on the outer side.

The thread means 54 terminate at the radial surface 56. Extending radially inward is the inner bore diameter including a first bore surface 58 that terminates at the shoulder 60 which in turn extends to the inner bore surface 62. The bore surface concludes at the shoulder 64, with the shoulder extending to the next inner bore surface 66, with the inner bore surface 66 containing inner thread means 68. The inner bore surface 66 also contains the groove 70 that will have disposed therein an o-ring member 72.

As depicted in FIG. 2, the insert housing 2, and in particular, the radially flat surface 14 will abut the shoulder 60 of the receptacle housing 44. Further, a retaining ring 74 is included with the apparatus. The retaining ring is generally cylindrical member having an outer surface containing external thread means 76 that conclude at the radial shoulder 78. The radial shoulder 78 will extend to the inner bore surface 80. The thread means 76 cooperate with the thread means 68. Thus, as the retaining ring 74 is threaded into place, the radial shoulder 78 acts to retain the insert housing 2 via the shoulder 6.

The apparatus will be attached to a generating means, positioned within the container, for generating the electrical current that will ultimately be transmitted via the electrical conductor 4. The generating means 84 may be a zinc reference electrode used for monitoring the voltage potential of the steel container for corrosion purposes. A zinc reference electrode was described and claimed in a patent application filed concurrently by applicant, with said application being entitled "NOVEL REFERENCE ELECTRODE AND METHOD". This application is incorporated herein by reference thereto.

The generating means 84 will have a zinc material that will have extending therefrom an electrical conductor 86 that will be disposed within the second end 38 of the solder cup 30. The second end may be solder onto the electrical conductor 86 by heat as is well known in the art.

Also as seen in FIG. 2 is the sealing tape means 88 for encapsulating the solder cup and the first end of the electrical conductor from electrolytes contained within the effluent and otherwise shorting out the connection. In the preferred embodiment, the sealing tape means 88 is a tape that is wrapped about the components of the electrical conductor 86, solder cup 30, electrical conductor 4 and surface 16 of the insert housing 2, with the tape being commercially available from Ray Chem Corp. under the name ¾"×25' Gel Tek Tape.

The apparatus will also contain a heat shrink sleeve 90 that is placed over the components of the sealing tape means 88, electrical conductor 86, solder cup 30, electrical conductor 4 and surface 16 of the insert housing 2. After placement, the sleeve is heated so that it shrinks about those components. The heat shrink sleeve 96 is commercially available from Ray Chem Corp. under the name WCSM 93150S.

In accordance with the teachings of the present invention, the generating means 84 may be other types of members that generate an electrical signal. The invention is applicable to transmit an electrical current through any type of bulk head with differential pressures. Thus, the container may have associated therewith pressure and temperature sensors. In application, the pressure and/or temperature sensor would be attached to the solder cup 30 as previously described i.e. with the sealing means 88 and heat shrink sleeve.

FIG. 2 depicts P1 which is representative of the pressure within the container. The pressure exemplary of the outer portion of the container is represented by P2. Thus, P1 is greater than P2 and due to the novel apparatus design, the pressure within the container (P1) will be prohibited from migrating to the outer portion of the container.

Figure 3:
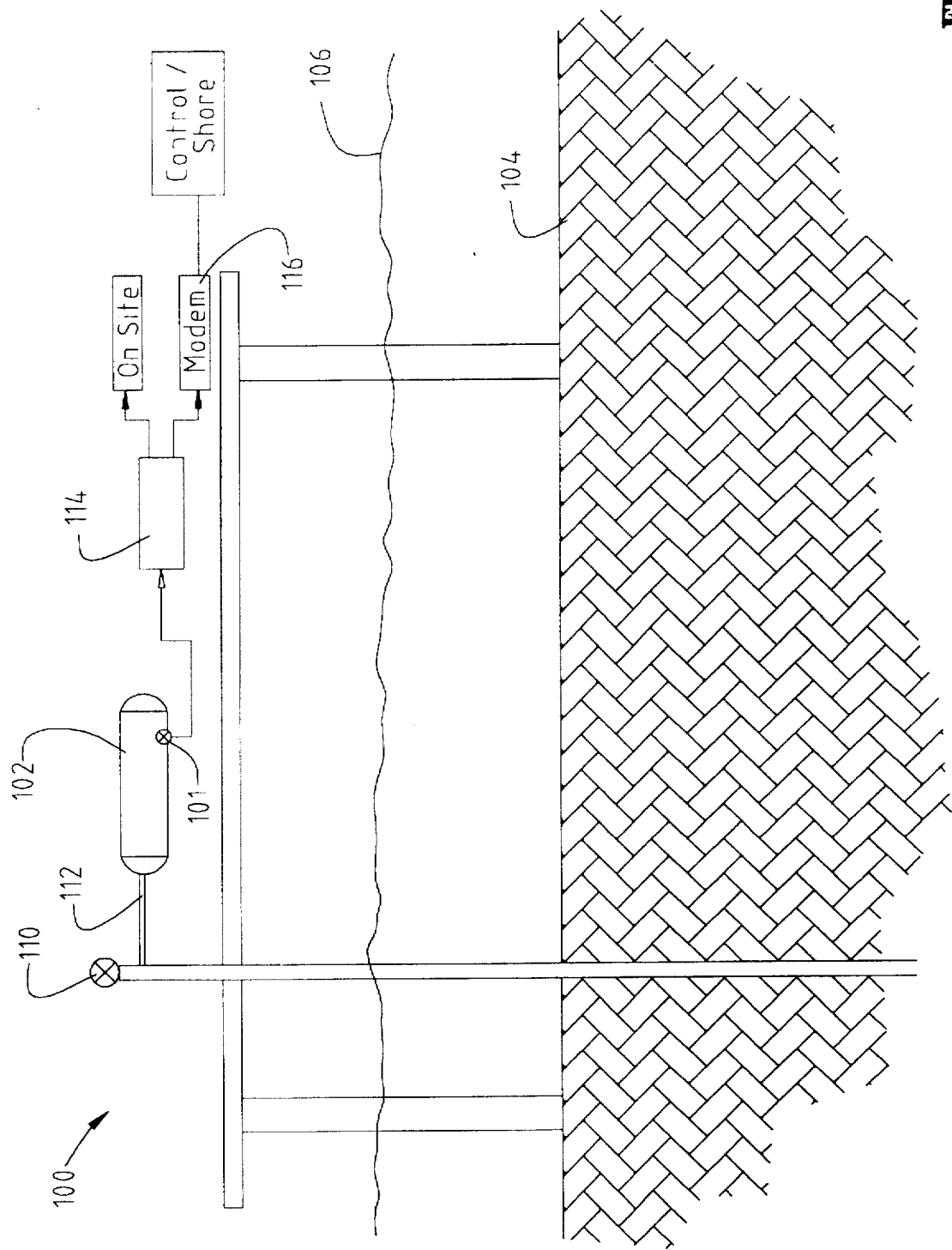
FIG. 3 is a schematic illustration of a typical offshore installation.

Referring now to FIG. 3, a process diagram of a representative offshore platform 100 utilizing the apparatus— within a container 102 will now be described. Thus, platform 100 is set on the ocean floor 104 with the sea level represented by numeral 106. The platform 100 will contain a well 108 extending to subterranean reservoirs as will be appreciated by those of ordinary skill in the art. The well 108 will serve as a conduit for the production of reservoir fluids and gas. As is well understood by those of ordinary skill in the art, the well 108 has associated therewith valve means 110, also referred to as a christmas tree.

The flow line 112 leads to the container 102 which may be an oil and gas separator for separating the effluent from the well into an oil phase, water phase and gas phase. Due to the chemical composition of the effluent coupled with the high pressure and high temperature, the separators 102 employed in the oil and gas business have a great exposure to corrosion, as will be appreciated by those of ordinary skill in the art. It should be noted that while a separator has been used in FIG. 3, the invention is applicable to other types of containers to be monitored such as pipelines, flow lines, pressure vessels, etc.

In accordance with the teachings of the present invention, the novel apparatus 101 has been added to the separator 102. The separator 102 will be under pressure ranging from a few psi to over 5,000 psi. The apparatus 101 is added within an opening formed on the separator 102 wherein the external threads 54 are sealingly mated on internal threads located within the opening on separator 102. The generating means 84 is positioned within the separator 102, sealed from the outer atmosphere.

The electrical conductor 86 will transmit an electric signal representative of the output signal of the type of sensing means located within the separator 102, which in one embodiment may be a pressure sensor transmitting an analog signal. The electric current is transmitted via the solder cup 30 and electrical conductor 4 path. A coupling device (not shown) is fitted into the inner bore surface 66 and received with the electrical conductor end 4A. Thus, in accordance with the teachings of the present invention, the operator may provide for transmitting this electrical current to the computer converter means 114 that will convert the analog signal to a digital signal. From this computer converter means 114, it is possible for the operator to monitor the produced signals on the platform 100, or alternatively, the operator can have a modem 116 hooked up to the computer means 114 so that the output may be transmitted to a second location, such as another platform or a shore base.

Changes and modifications in the specifically described embodiments can be carried out without departing from the scope of the invention which is intended to be limited only by the scope of the appended claims.

I claim:

1. A device for transmitting an electrical current through a bulk-head, with the bulk-head having an opening therein, the bulk-head having a first side and a second side, with the first side having a first pressure and the second side having a second pressure and wherein the first pressure is greater than the second pressure, the device comprising:

a housing, fitted within the opening, said housing having an inner diameter and an outer diameter and wherein said housing includes: a receptacle housing having an outer diameter and an inner diameter, said receptacle housing having external thread means for threadedly engaging the opening of said bulkhead; and an insert housing disposed within said inner diameter of said receptacle housing, said insert housing having an inner bore and an outer surface and wherein said outer surface contains seal means for sealingly engaging said inner diameter of said receptacle housing;

a pin contact operatively positioned within said inner bore of said insert housing, with said pin contact having a first end and a second end;

a cup member having a first opening and a second opening, said cup member consisting of a solder material, with said first end of said pin contact being received within said first opening and wherein said pin contact and said inner bore of said insert housing forming a chamber, with said chamber being filled with a glass sealant compound so that said first pressure is sealed from said second pressure;

generating means, operatively adapted to said cup member, for generating an electrical current representing a measured physical parameter within said first side, and wherein said generating means contains a first end and a second end, with said second end being received within said second opening of said cup member; and a sleeve member adapted for coupling said pin contact and said cup member so that the electrical current is transmitted from said generating means to said pin contact.

2. The device of claim 1 further comprising:

retaining ring means, operatively associated with said inner diameter of said receptacle housing, for retaining said insert housing within said receptacle housing.

3. The device of claim 2 wherein said bulk-head is part of a pressure separator, and the generating means is a zinc reference electrode means for measuring a voltage potential between an electrode and said pressure separator.

4. The device of claim 2 wherein said bulk-head is part of a pressure separator, and the generating means is a pressure sensor means for measuring the pressure within said pressure separator.

5. The device of claim 2 wherein said bulk-head is part of a pressure separator, and the generating means is a temperature sensor means for measuring the temperature within said pressure separator.

6. An apparatus for transmitting an electrical current, the apparatus being associated with a container having an inner portion and an outer portion, and wherein said inner portion is under a pressure, and wherein said container has an opening therein, said apparatus comprising:
- a housing received within said container opening, and wherein said housing contains an inner diameter and an outer diameter and wherein said housing comprises: a receptacle housing having an outer surface and an inner surface, said receptacle housing having external thread means for threadedly engaging the opening of said bulkhead; and an insert housing adapted within said inner surface of said receptacle housing, said insert housing having an inner diameter and an outer diameter, with said outer diameter containing a first seal means for sealingly engaging said inner surface of said receptacle housing;
- an electrical conductor having a first end and a second end, said electrical conductor being disposed within said inner diameter of said housing and wherein said electrical conductor is disposed within said inner diameter of said insert housing;
- a second sealing means for sealing said electrical conductor within said inner diameter of said insert housing so that the pressure is prevented from migrating through said inner diameter of said insert housing, said second sealing means including a glass sealant compound placed within said inner diameter of said insert housing;
- generating means, positioned within said inner portion of said container, for generating the electrical current and wherein said generating means has a first end and a second end;
- attaching means for attaching said generating means and said electrical conductor so that said electrical current is transmitted to said electrical conductor and wherein said attaching means comprises a cup member consisting of a solder material, said cup member including a first opened end and a second opened end, and wherein said first opened end is threadedly attached to said electrical conductor and said second opened end has received therein said first end of said generating means.

7. The apparatus of claim 6 wherein said electrical conductor comprising a metal alloy, said metal alloy consisting of: nickel and iron.

8. The apparatus of claim 7 wherein said container is a separator means for separating a reservoir fluid and gas and wherein said generating means is a reference electrode means for measuring a voltage potential between an electrode and said pressure separator.

9. The apparatus of claim 7 wherein said container is a separator means for separating a reservoir fluid and gas and wherein said generating means is a pressure sensor means for measuring the pressure within said separator and generating a signal indicative of the pressure.

10. The apparatus of claim 7 wherein said container is a separator means for separating a reservoir fluid and gas and wherein said generating means is a temperature sensor means for measuring the temperature within said separator and generating a signal indicative of the temperature.

11. The apparatus of claim 7 wherein said sealing means comprises a glass sealant compound within said inner diameter of said insert housing.

12. The apparatus of claim 11 further comprising:
- sealing tape means for encapsulating said cup member, said first end of said generating means and said first end of said electrical conductor;
- a shrink sleeve member, disposed about said sealing tape means and adapted for coupling said attaching means and said first end of said electrical conductor.

* * * * *